United States Patent
Brueckmann et al.

(10) Patent No.: US 7,168,927 B2
(45) Date of Patent: Jan. 30, 2007

(54) PRESSURE EXCHANGER SYSTEM

(75) Inventors: Fred Brueckmann, Bad Duerkheim (DE); Wiltrud Knoebl, Ludwigshafen (DE); Uwe Bruhns, Osthofen (DE); Wolfgang Kochanowski, Windesheim (DE)

(73) Assignee: KSB Aktiengesellschaft, Frankenthal (DE)

( * ) Notice: Subject to any disclaimer, the term of this patent is extended or adjusted under 35 U.S.C. 154(b) by 88 days.

(21) Appl. No.: 11/013,321

(22) Filed: Dec. 17, 2004

(65) Prior Publication Data

US 2005/0166978 A1  Aug. 4, 2005

(30) Foreign Application Priority Data

Dec. 17, 2003  (DE)  ............... 103 59 332
Jun. 17, 2004   (DE)  ............... 10 2004 029 231

(51) Int. Cl.
*F04F 11/00*  (2006.01)

(52) U.S. Cl. ....................................... 417/392

(58) Field of Classification Search ................ 417/392, 417/393
See application file for complete search history.

(56) References Cited

U.S. PATENT DOCUMENTS

| | | | | |
|---|---|---|---|---|
| 3,431,747 A | * | 3/1969 | Hashemi et al. ............... 62/123 |
| 4,637,783 A | * | 1/1987 | Andeen ....................... 417/318 |
| 5,306,428 A | * | 4/1994 | Tonner ........................ 210/652 |
| 5,797,429 A | | 8/1998 | Shumway | |
| 6,017,200 A | * | 1/2000 | Childs et al. ............... 417/404 |
| 6,537,035 B2 | * | 3/2003 | Shumway ..................... 417/64 |

FOREIGN PATENT DOCUMENTS

| | | |
|---|---|---|
| DE | 100 57 613 A1 | 5/2002 |
| FR | 2 568 321 A | 1/1986 |
| GB | 2 204 664 A | 11/1988 |
| JP | 2003-144856 | 5/2003 |

* cited by examiner

*Primary Examiner*—John Fox
(74) *Attorney, Agent, or Firm*—Crowell & Moring LLP

(57) ABSTRACT

A pressure exchanger system having at least two tubular chambers, in which a plurality of reversing valves reverse the flow paths of fluid flows through the at least two tubular chambers. At least one driven reversing valve alternately reverses the flow paths between a supply source, which supplies a high-energy high-pressure fluid, and the tubular chambers. In reversing the liquid flows and shutting off previously open flow paths, the driven reversing element in the reversing valve executes a discontinuous or variable movement sequence.

42 Claims, 2 Drawing Sheets

PRESSURE EXCHANGER SYSTEM

FIELD OF THE INVENTION

The present invention relates generally to a pressure exchanger system and more particularly to a pressure exchanger system having at least two tubular chambers. Multiple reversing valves which reverse the flow paths of fluid flows through the at least two tubular chambers are provided. At least one driven reversing valve which alternately reverses the flow paths between the tubular chambers and a supply source which provides a high-energy high-pressure fluid are also provided.

BACKGROUND OF THE INVENTION

U.S. Pat. No. 5,306,428 describes a work exchanger system as part of a reverse osmosis system such that, with the help of this work exchanger system, energy is recovered from the fluid, called the brine, which leaves reverse osmosis modules but still has a high residual pressure. The work exchanger system has a reversing valve with a rotating reversing element with the help of which the tubular chambers to be filled or emptied are switched. The rotating reversing element has a bypass opening to permit a controlled reduction in pressure between the tubular chambers to be filled and those to be emptied during the operation of reversing the work exchanger. However, this results in additional losses, which have an adverse effect on the efficiency of such a reverse osmosis system.

U.S. Pat. No. 5,797,429 discloses another design of a reversing valve for a work exchanger system. A reversing element is provided in the valve housing, and is constructed as a linearly displaceable control piston to reverse flow paths arranged radially with respect to the control piston. This approach attempts to improve upon a previous state of the art in which the filling and emptying operations in the tubular chambers were reversed with a plurality of valves in a complicated manner.

In the prior art devices, the alternating pressure loads and the resulting pressure surges produce a substantial material stress on all components. This reduces the service life of the valves, the tubular chambers and any individual reversing valves and requires material-intensive construction, accordingly. In addition, considerable annoying noises with negative consequences are produced during the reversing movements. Such a high noise level requires additional complex noise suppression measures and safety measures.

SUMMARY OF THE INVENTION

The present invention is directed toward providing a system that will be reliable in operation over a long period of time and will be capable of withstanding high loads for pressure exchanger systems having at least two tubular chambers and a driven reversing valve which is equipped with a rotating or linearly operable reversing element.

To achieve this object, the driven reversing element in the reversing valve uses a variable and/or discontinuous movement sequence for reversing the direction of the fluid flows and for shutting off flow paths that were previously open.

This approach has the advantage of greatly reducing the pressure loads on all components resulting from the flowing masses of fluid and their deceleration. The fluid columns flowing in the components exert considerable momentum forces on the components. The direction of flow of the fluid columns is alternately reversed to achieve a pressure exchange within the tubular chambers. The momentum forces of the fluid columns result from the mass being decelerated and the rate thereof. Due to the variable and/or discontinuous movement sequence of the driven reversing element in shutting off previously opened flow paths, the flow rate of a fluid mass entering a tubular chamber is decelerated, thereby reducing its momentum.

Certain embodiments of this invention provide for the driven reversing element to have a reduced rate of movement when shutting off a filled tubular chamber. The rate of movement here is the path of the reversing element over time. A reduction in the rate of movement of the driven reversing element takes place immediately before closing or shutting off a tubular chamber. These measures achieve a controlled movement of the flowing fluid masses, so that pressure surges which have been customary in the past (also known as water hammers) are largely prevented when closing or shutting off a filled tubular chamber. Due to this new variable and/or discontinuous control of the driven reversing element, the pressure load on the entire system is greatly reduced because pressure surges due to sudden deceleration of the flowing fluid mass are eliminated.

According to other embodiments, the change or reduction in rate of movement of the reversing element may be in the range of a few milliseconds to a few seconds, where this period of time depends on the design size of a pressure exchanger and the mass of liquid moving inside it. The reduction takes place within an actuation time, which is defined as the total period of time required for the change in the state from a completely opened reversing valve to a completely closed reversing valve. This allows the use of fundamentally higher flow rates within the pressure exchanger. This measure is in complete contradiction with the procedure used in the prior art, according to which there was a continuous reduction in the flow velocity to reduce water hammer-induced damage to components.

In accordance with other embodiments, after a tubular chamber filled with low pressure is shut off, the driven reversing element assumes a holding point, and at this holding point, the rate of movement of the driven reversing element is reduced to zero for a period of time ranging from a few milliseconds to a few seconds. A transition zone, in which there is thorough mixing of the fluids alternately flowing in, develops between the mass flows alternate within the tubular chambers. Such as transition zone may also develop in a tubular chamber provided with a physical separating body. Such a physical separating body facilitates an almost complete separation between the liquids that are to be exchanged.

In the operation of a pressure exchanger, the transition zones/separation bodies are displaced in the tubular chambers and in relation to one another. To prevent a transition zone or a separating body from assuming a wrong position inside a tubular chamber, it is necessary to synchronize these transition zones/separating bodies. In order to achieve this synchronization, the fluid flow in one of the tubular chambers is stopped, while the fluid movement continues in another tubular chamber, e.g., in the case of a two-chamber system.

With these approaches, the rates of the mass flows moving in the tubular chambers as well as the positioning of the transition zones or separation bodies in relation to one another are synchronized in the simplest way. For those cases in which physical separation bodies within the tubular chambers form transition zones between the liquids at different pressure levels, their synchronization is accomplished within the tubular chambers.

After a given residence time of the driven reversing element at the holding point, the driven reversing element is accelerated to the normal rate of movement. To this end, a conventional drive element is used, e.g., a motor whose rotational speed and/or translational movement is/are variable.

Thus, in accordance with some embodiments, a drive motor for the reversing element has variable rotational speeds and/or translational movements. The movement sequence of the reversing element is thus controlled very easily and is adapted to the particular situation in a pressure exchanger system. To this end, the drive motor may be designed as an electric, hydraulic or hydropneumatic servomotor. In addition, the drive motor may be connected to a control or regulating device that influences its speed and/or dynamics.

According to other embodiments, the tubular chambers are equipped with multiple sensors which detect the position and movement of separating pistons, and regulable valves are provided downstream from a booster pump and the reversing valve. The booster pump and/or the reversing valve are also connected to a regulable drive. The sensors, the regulable valves and the regulable drives are connected to a control and regulating unit. The control and regulating unit monitors, by means of sensor signals, the movement sequences of the fluid flows in the tubular chambers and/or the separating piston. The control and regulating unit alters the sequences in the pressure exchanger and the function of the regulable valves and drives when there are deviations in predetermined sequences. The control and regulating unit does this by transmitting actuator signals to the regulable valves and/or the regulable drives. Thus, the control and regulating unit controls and regulates the synchronization of the pressure exchanger. Synchronization in this context is understood to refer to the readjustment and regulation of the fluid flow rate in one tubular chamber when a change in flow rate has occurred in another tubular chamber. The movement sequences within the pressure exchanger are optimized to achieve pressure reversals while avoiding pressure surges or pressure impacts.

The driven reversing valve is preferably connected downstream from a high pressure source. This may be, for example, the output of a brine discharged from a reverse osmosis module under a high residual pressure and whose pressure energy is recovered using the pressure exchanger system.

In other embodiments, the reversing valve is provided with one or more rotatably driven reversing elements or one or more reversibly linearly driven reversing elements or the reversing element executes a combination movement consisting of both a rotational movement and a translational movement.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

For simplicity and illustrative purposes, the principles of the present invention are described hereinafter with reference to various illustrative embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not depart from the true spirit and scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation.

Figure 1:
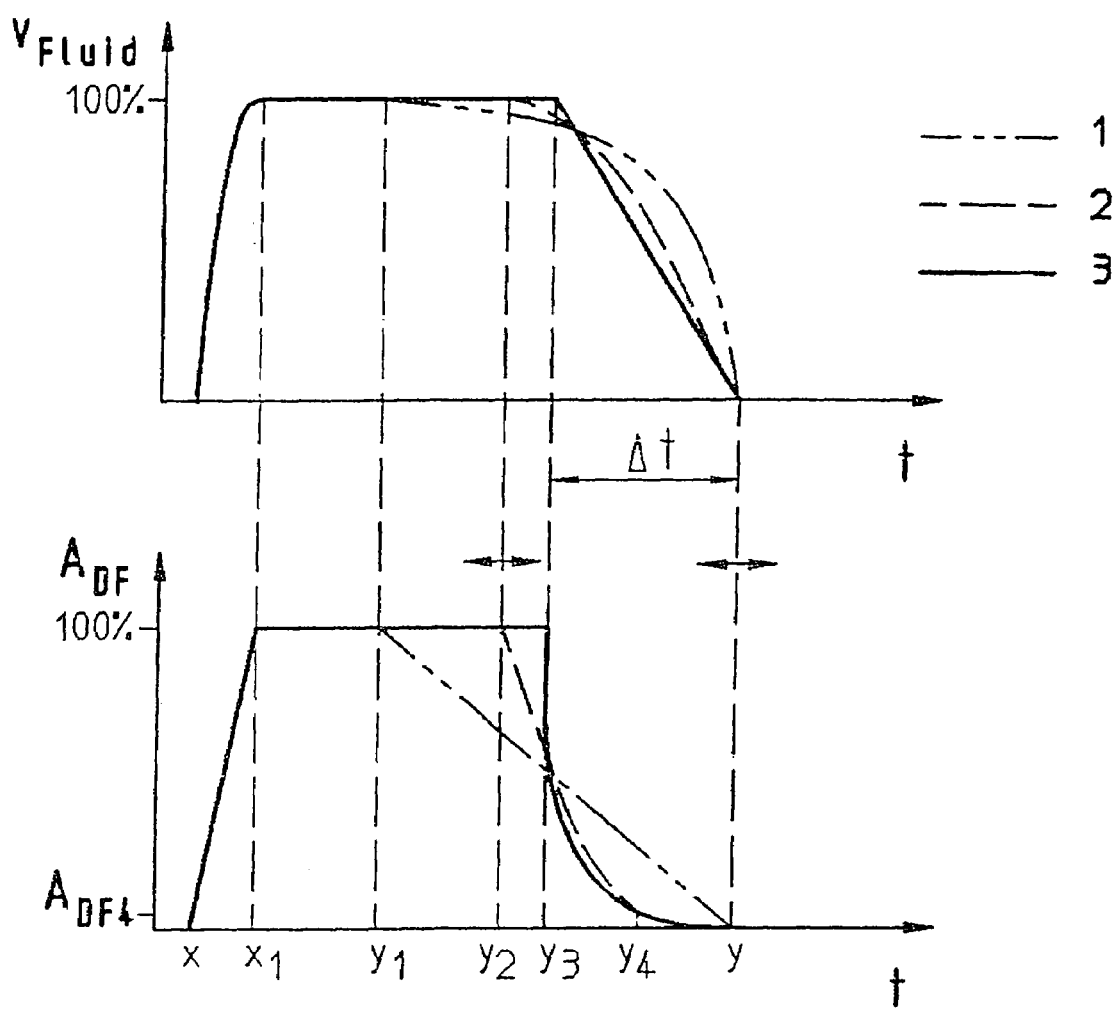
FIG. 1 shows two graphs depicting the operation of a pressure exchanger system according to the invention.

A variable and/or discontinuous movement sequence of a driven reversing element is illustrated in FIG. 1 with the help of two diagrams arranged one above the other. The diagrams each show the time axis t plotted on the abscissa. The movement sequence is independent of the design of the reversing element, which may execute rotational movements and/or linear movements.

The curves plotted on the time axis are based on a cycle of filling a tubular chamber with fluid, where the point x on the time axis t denotes the starting time of an operation of filling a tubular chamber, while the point y corresponds to the end of a filling operation in time.

In the lower diagram, the flow cross section $A_{DF}$ is plotted on the ordinate. This corresponds to the area that is opened and closed again by the reversing element in the reversing valve during a reversing operation between the tubular chambers. During a period of time x-y, a cycle of a filling operation takes place in a tubular chamber (not shown here). From the start of an opening movement at the point in time x until a later point in time $x_1$, the flow cross section opens completely $A_{DF}$ within a reversing valve. Depending on the volume of the tubular chamber to be filled, the flow cross section $A_{DF}$ remains completely open until the point in time $y_1$.

With the pressure exchanger systems according to the background art, the operation of closing a tubular chamber by a reversing element of a reversing valve has already started at the point in time $y_1$. A closing operation takes place in the reversing valve along the dash-dot line 1, beginning early at $y_1$, continuing over time and ending at y. The flow cross section $A_{DF}$ of the reversing valve is closed along the dash-dot line 1 in the period of time $y_1$-y. The early start at the point in time $y_1$ is necessary to reduce the load on the system due to the momentum forces of the column of liquid flowing in a tubular chamber. Despite such an early start of a closing movement, considerable pressure pulsations occur in the period of time $y_1$-y and have a negative effect; they also affect the known noise levels, which are very offensive.

According to the present invention, a variable and/or discontinuous closing operation of a tubular chamber does not begin until much later at the point in time $y_2$. The closing operation takes place along the dashed line 2 and is a controlled movement sequence which is discontinuous over time and/or variable and is also concluded at the point in time y. In an inventive closing operation, the closing movement of the reversing element is faster and takes place in a shorter period of time in comparison with that known in the state of the art. The start of a reduction in the flow cross section $A_{DF}$ which is 100% open does not occur until a much later point in time $y_2$ and a reduction in cross section is largely concluded by the point in time $y_4$. In the subsequent period of time $y_4$-y, there is then a slow closing movement of the remaining flow cross section $A_{DF4}$ which by now is relatively small. The gradual closing of the small flow cross section $A_{DF4}$ of the reversing valve to a value of zero reliably reduces the noise level and the development of pressure surges.

Due to this time lag shortly before the final end of the closing movement, the momentum of the flowing masses in the flow cross section $A_{DF4}$, which is now only closing gradually, is dissipated with no problem, and the closing operation is concluded in a virtually pressureless manner. The result of this is an almost silent closing operation in the reversing operations within a reversing valve and in such a pressure exchanger system. As an additional advantage, there is a much lower load on the material due to the reduced pressure pulsations.

The solid line 3 between the points in time $y_3$ and y corresponds to the ideal case. Here the closing procedure is initiated at a later point in time $y_3$ and the 100% open flow cross section $A_{DF4}$ is mostly closed down to the flow cross section $A_{DF4}$ within a very short period of time, i.e., by the point in time $y_4$. Then in the period of time $y_4$-y, the momentums that prevail in the flow cross section $A_{DF4}$ which is being reduced relatively gradually are dissipated due to a closing operation that proceeds more slowly or over a longer period of time. This theoretical ideal case cannot be achieved due to the forces of inertia of the components and dead time in a regulating operation. With a suitable drive, it is possible to very closely approximate the ideal case of curve 3 in the critical range between $y_3$ and $y_4$. A drive which complies with the ideal case would have to move the reversing element out of the resting position almost into the closed position in a disproportionately short period of time. The forces of inertia and the known designs of drives allow such an acceleration only to a limited extent.

When a drive motor is used, the choice of the drive motor depends on the masses to be moved or cut off. The drive motor allows the desired movement operations of the reversing element within the reversing valve. These movements are controlled over a period of time as desired. The drive may be a continuously controllable servomotor or a two-stage or multistage drive having various speed levels.

With the help of an additional regulating device (not shown here), the position of the various points in time $y_2$-y on the horizontal time axis may be shifted. This is symbolized in the diagram by double horizontal arrows on the time lines $y_2$ and $y_4$. With the help of simple sensors, e.g., sound sensors, it is possible to have a simple regulation of the pressure exchanger system by displacement of the points in time yx when unacceptable noise situations occur due to changes in installation conditions or component conditions. This ensures that the geometric point at which the flow cross section $A_{DF4}$ is tightly closed in the reversing valve coincides with the point in time y. Component tolerances can thus be compensated through the control technology in a simple way.

In FIG. 1, the fluid velocity $v_{fluid}$ is plotted on the ordinate as a function of the time axis t. All the points in time x-y plotted on the upper time axis t correspond to the corresponding points in time in the lower diagram. The rapid increase in rate in filling a tubular chamber with fluid from the beginning of opening at the point in time x of the reversing valve through a reversing element can be seen in the upper diagram. At the point in time $x_1$, the fluid velocity $v_{fluid}$ has approximately reached its maximum, then remains at approximately the same level.

With the pressure exchanger systems according to the background art, the closing movement of the reversing element is already initiated at the point in time $y_1$, by analogy with the dash-dot curve 1, then completely cutting off a tubular chamber during the long period of time $y_1$-y and at the point in time y. Such a constant closing operation according to curve 1, which shows the decline in fluid velocity $v_{fluid}$ within a tubular chamber until it is completely cut off by the reversing element, is illustrated in this diagram as an essentially known mathematical function.

According to this invention, the closing movement of the reversing element is initiated at a later point in time $y_2$ because of the closing operation taking place variably and/or discontinuously. It proceeds in a controlled manner along the dotted-line curve 2 in the shorter period of time $y_2$-y and is concluded at the point in time y. The upper diagram shows clearly that before the end point y of the curve 2, the decline in velocity of the fluid takes place over a longer period of time on the time axis t, so that the momentum load on the system as a whole is greatly reduced.

The ideal case which can be achieved conditionally because of component tolerances is represented by the solid line 1, shown as a straight line in this diagram. The fluid velocity $v_{fluid}$ declines continuously starting at the point in time $y_3$ in the shortest period of time $\Delta t$ between the points in time $y_3$ and y on the basis of the variable and/or discontinuous closing movement of the reversing element of a reversing valve. The theoretical ideal state is reached when $$dv_{fluid}/dt = const. \tag{1}$$

Due to the usual component tolerances in a pressure exchanger system, this ideal state occurs only in rare cases.

Overall, the momentum load of a pressure exchanger system is improved considerably with the discontinuous closing movement of the reversing element and the resulting noise burden is very greatly limited. Furthermore, higher fluid velocities are achieved in the tubular chambers and thus the profitability of such a pressure exchanger system is greatly improved.

The columns of fluid that are moved in alternation in the tubular chambers have a momentum which corresponds to the movement quantity of a body, as determined according to the equation $$I = m * v_{fluid}^2 \tag{2}$$

When a tubular chamber is cut off, the motion of a column of liquid flowing in it is decelerated, thus resulting in a change in momentum of the following form:

$$\Delta I = I \tag{3}$$

The change in momentum $\Delta I$ conforms to the following condition:

$$\Delta I = F * \Delta t \tag{4}$$

so the following is obtained when equation (1) is equated with equation (3):

$$F * \Delta t = m * v_{fluid}^2 \tag{5}$$

The pressure load of the pressure exchanger system is proportional to the force F with which the momentum of the moving column of liquid acts on the pressure exchanger system in deceleration because $$p = F/A \tag{6}$$

so the pressure load is reduced in the simplest way by increasing Δt. Therefore, this yields a greatly reduced pulse load for the system as a whole due to the variable and/or discontinuous movement sequence of the reversing valve in cutting off previously opened flow paths. It has been recognized according to this invention that only in the last part of the overall movement of the driven reversing element is there a definite reduction in the rate of movement w reducing the pressure load of the pressure exchanger system to the same extent. Advantageously this part of the movement of the driven reversing element is easy to influence. The forces of momentum are influenced disproportionately by minor changes in the movement sequence over time in a closing operation, so that on the whole a higher throughput and a higher velocity of flow can be achieved in the pressure exchanger system with reduced component dimensions at the same time.

Figure 2:
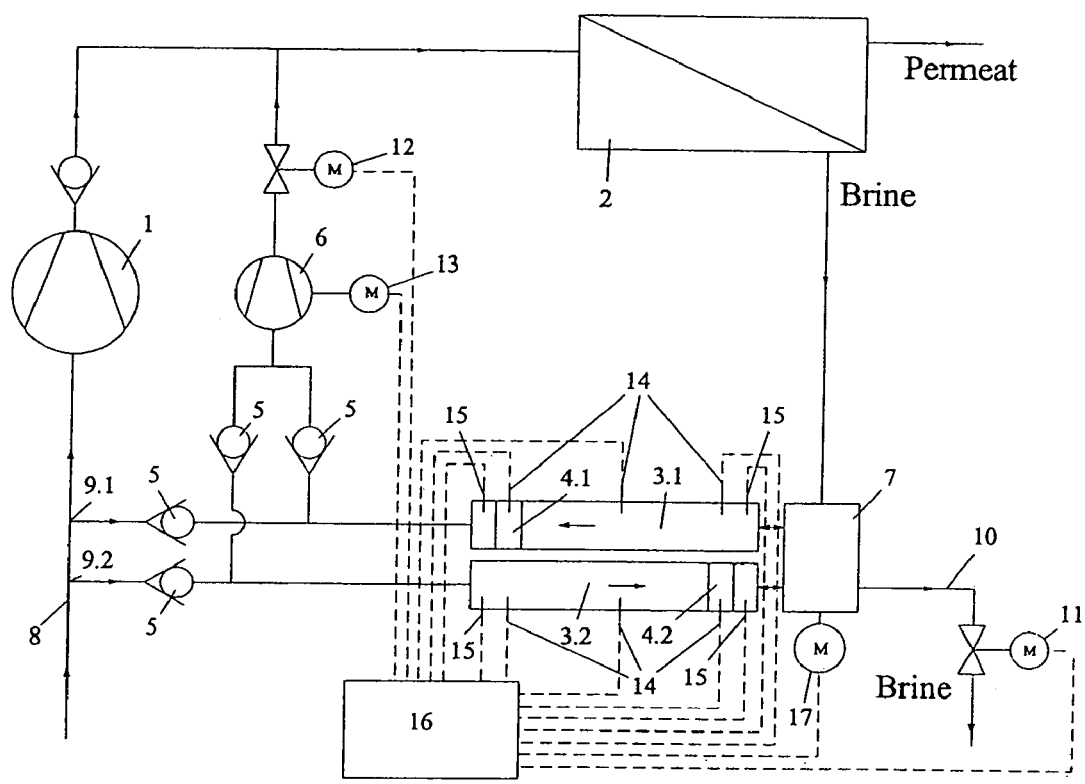
FIG. 2 shows a schematic diagram of an embodiment of the invention.

FIG. 2 shows an exemplary circuit diagram of a pipeline system of a reserve osmosis installation. A high pressure pump 1 delivers a fluid that is to be treated, usually water in the form of seawater, ocean water or brackish water or even wastewater to one or more reverse osmosis modules 2. Due to the high osmotic pressure inside these modules 2, there is a separation effect on the membranes provided in them. Filtered liquid, the so-called permeate, flows out at a low pressure downstream from the membranes, is collected and sent for further use.

After the separation process, a fluid in front of the membranes flows out of the reverse osmosis modules 2. This fluid, which is called brine, has a higher concentration of contaminants, usually salts, and is diverted back to the original source. To utilize the high energy content in the form of compressive energy, the brine is sent through a reversing valve 7 to a pressure exchanger, which is depicted here as a two-chamber pressure exchanger, for recovery of energy. In its tubular chambers 3.1, 3.2, separating pistons 4.1, 4.2 are arranged so that they can be displaced under the influence of pressure and produce a separation between two spaces of a tubular chamber and their liquids which are acted upon with different pressures. Installations with tubular chambers without separating pistons are also known, but there may be unwanted mixing effects in these systems between the different fluids when the system gets out of equilibrium or its control times are no longer correct.

The high pressure of the brine coming out of the one or more reverse osmosis modules 2 forces a separating piston 4.1, which is the upper piston in FIG. 2 and is in a first tubular chamber 3.1, toward the side which is at a distance from the reversing valve 7. In doing so, the high pressure is transferred to another fluid which is at the left of the separating piston 4.1 in the tubular chamber 3.1 or to the fluid on the side of the piston at a distance from the reversing valve 7. The high pressure is transferred to a fluid having a lower pressure, also known as the feed fluid. This feed fluid taken from a line 8 may be supplied in a wide variety of ways and is not limited to the embodiment depicted here.

This fluid then flows out at a high pressure on the left side of the upper tubular chamber 3.1 of the pressure exchanger and then flows through non-return valves 5 to a booster pump 6, which is situated inside the pipeline system. The non-return valves 5 prevent return flow of the fluid into the line 8, which now has a higher energy content. The booster pump 6 compensates only the low pressure drop which occurs in the osmotic process in the reverse osmosis modules 2. Due to the energy recovery by the pressure exchanger, the booster pump only delivers the pressure difference lost within the reverse osmosis module 2. Therefore, the high-pressure pump 1 may be much smaller and thus less expensive than in an installation without energy recovery.

A fluid to be treated, also known as a feed fluid, flows through the line 8 to the high-pressure pump 1. Two branches 9.1, 9.2 with non-return valves 5 are shown here as departing from the line 8, with a partial flow of the fluid or feed fluid flowing through these valves to the tubular chambers 3.1, 3.2 of the pressure exchanger. This type of supply is not obligatory for the functioning of the installation. Other types of fluid supplied to the pressure exchanger and the high-pressure pump 1 may also be used. It is relevant only that an inlet pressure prevails in the lines 9.1 and 9.2 leading to the tubular chambers 3.1 and 3.2, this inlet pressure being sufficient to move a fluid through the non-return valves 5 and a separating piston 4.1 or 4.2 from the end of the tubular chamber on the side of the non-return valves 5 to the other end of the tubular chamber on the side of the non-return valve 7.

When the separating piston 4.1 within the first tubular chamber 3.1 reaches its tubular chamber end, which is at the left in the drawing and is situated this side of the non-return valves 5, then the reversing valve 7 is reversed, so that a connection to an area with a low pressure is now established for the first tubular chamber 3.1. The inlet pressure of a feed fluid now flowing out of the feed line 9.1 to replenish the fluid is sufficient to push back the separating piston 4.1 with fresh fluid and the brine which is in the tubular chamber 3.1 and is now depressurized to push it to the right toward the reversing valve 7 and out of the upper tubular chamber 3.1. The brine flows out through the reversing valve 7 and a line 10 connected to it. During the process of discharge of the brine out of the first tubular chamber 3.1, the lower second tubular chamber 3.2 is at the same time acted upon by the high pressure of the brine via the reversing valve 7.

The process of ejection of a depressurized brine is depicted in FIG. 2 in the second lower tubular chamber 3.2. Through a appropriate cyclic reversing of the reversing valve 7, there is an alternating pressure acting on the two tubular chambers 3.1, 3.2 and thus there is an efficient energy recovery.

In the reversing operation of a pressure exchanger, press surges occur which endanger the membranes inside the reverse osmosis modules 2. According to this invention, the system is regulated, with a regulable valve 11 being situated in the line 10 which carries the brine away from the reversing valve 7. In addition, another regulable valve 12 is provided in the area of the booster pump 6 or alternatively, the booster pump 6 is provided with a regulable drive 13.

The tubular chambers 3.1, 3.2 are provided with multiple sensors 14 and 15, with the sensors 14 on the one hand serving to determine the position and on the other hand determining the respective speed of the separating pistons 4.1, 4.2. The sensors 15 serve to detect possible end positions of the separating pistons. All the sensor signals are fed into a control and regulating unit 16, which supplies actuator signals to the actuator motor 17 of the reversing valve 7, the regulable valves 11, 12 and/or to a regulable valve 11 and the regulable drive 13 of the booster pump 6. The regulable valves 11, 12 may be designed as a valve with an actuator drive or as a valve with a position regulator. A precise sequence of switching for the entire installation is possible through a control and regulating unit 16.

To ensure trouble-free operation of such reverse osmosis membranes, there is a continuous feed flow to the membranes. This is ensured by a difference in the rate of movement of the separating pistons in the tubular chambers.

The arrows in the drawing indicate the direction of movement of the separating pistons. In the exemplary embodiment illustrated in FIG. 2, the tubular chamber 3.1 is filled with high-pressure fluid while the lower tubular chamber 3.2 is acted upon by a fresh feed fluid and a depressurized brine flows out through the line 10. The separating piston 4.2 here is moving at a higher speed in the lower tubular chamber 3.2 acted upon by a low pressure, than the separating piston 3.1 in the high-pressure chamber 3.1 that is acted upon by a high pressure. For this reason, the separating piston 3.2 reaches its reversal point first at the end of the tubular chamber. The fact that the reversal point has been reached is transmitted by the sensor 14 to the control and regulating unit 16, whereupon the latter delivers an actuator signal to the drive motor 17 of the reversing valve 7. The reversing valve 7 reverses and the pressures in the tubular chambers 3.1 and 3.2 are exchanged. At this point in time, the separating piston 4.2, which is in the end position, reverses its direction of movement and is accelerated into the opposite direction toward the non-return valves 5, so that at this point in time both of the dividing pistons 4.1 and 4.2 supply a high-pressure fluid in the direction of the booster pump 6. The period of time during which the two chambers 3.1, 3.2 and their separating piston supply a high-pressure fluid in the direction of the booster pump 6 is within the range of seconds before the separating piston 4.1 of the tubular chamber 3.1 has reached its point of reversal.

Additional sensors 15 are arranged at the ends of each tubular chamber and ensure signal transmission to the control and regulating unit 16, in case a separating piston should reach such an end position or dead position because of altered operating conditions. In this case, the sensors 15 will supply an alarm signal and the control and regulating unit 16 will start a new synchronization of the movement sequence of the separating pistons by means of actuator signals to the regulable valves and/or to the drive of the booster pump and/or the drive of the reversing valve 7. In this context, synchronization is understood to be the re-adjustment of the fluid velocity in a tubular chamber when there has been a change in velocity in the other tubular chamber. This synchronization effect also occurs when only the pressure exchanger is regulated. In this case, the booster pump follows via its throttle curve.

The reversal points as well as the speeds of the separating pistons 4.1, 4.2 for each pressure exchange cycle of a pressure exchanger are quantified aided by the sensors 14 so that each operating condition is determined by the change in the piston speed. This is true of startup and shutdown of an installation equipped with such a pressure exchanger.

With the help of the drive motor 17 on the reversing valve 7, this yields the essential advantage that the control and regulating unit 16 is able to react immediately from one reversing cycle to the next or even during a single reversing cycle. In addition, this yields the advantage that the control and regulating unit 16 can reliably regulate the operation and synchronization of multiple pressure exchangers in parallel or series connection. The continuous measurement of the velocity of flow in the tubular chambers 3.1, 3.2 of the pressure exchanger offers the additional advantage that this data is relayed directly to the booster pump of the system with the help of an interface if the system has a speed-regulated drive 13. However, if the booster pump has only a drive with a fixed rotational speed, then the power can be influenced downstream from the booster pump 6 by a regulable valve acting as a throttle valve.

While the invention has been described with reference to certain exemplary embodiments thereof, those skilled in the art may make various modifications to the described embodiments of the invention without departing from the true spirit and scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the invention as defined in the following claims and their equivalents.

NOMENCLATURE USED $A$=area in $m^2$
$A_{DF}$=flow area in $m^2$
$F$=force in N
$p$=pressure in bar
$I$=momentum in kgm/s
$\Delta I$=change in momentum in kgm/s
$m$=weight in kg
$w$=rate of movement of the reversing element in °/s or m/s
$\Delta t$=change in time in s
$v_{fluid}$=fluid velocity in a tubular chamber in m/s

What is claimed is:

1. A pressure exchanger system comprising:
   at least two tubular chambers;
   a plurality of control valves which control the flow of liquid through the at least two tubular chambers;
   at least one driven reversing valve which alternately reverses the fluid flow paths between the tubular chambers, and
   a delivery source which supplies a pressurized fluid;
   wherein, in reversing the direction of the fluid flow paths and shutting off previously open flow paths, a driven reversing element in the driven reversing valve executes a variable or discontinuous movement sequence such that immediately before closure of a tubular chamber the rate of movement of the reversing element is reduced relative to a normal rate of movement thereof.

2. The pressure exchanger system of claim 1, wherein the driven reversing element has a reduced rate of movement when shutting off a filled tubular chamber.

3. The pressure exchanger system of claim 1, wherein the direction of movement of the driven reversing element is reversed immediately before closure of a tubular chamber.

4. The pressure exchanger system of claim 2, wherein the reduction in the rate of movement is in the range of a few milliseconds to a few seconds.

5. The pressure exchanger system of claim 1, wherein after shutting off a tubular chamber filled with low pressure, the driven reversing element assumes a holding point.

6. The pressure exchanger system of claim 5, wherein the rate of movement of the driven reversing element is reduced to zero at the holding point for a residence time in the range from a few milliseconds to a few seconds.

7. The pressure exchanger system of claim 5, wherein after the rate of movement of the driven reversing element is reduced to zero at the holding point, the flow is accelerated to the normal rate of movement (w).

8. The pressure exchanger system of claim 1, wherein the driven reversing element is driven by a drive motor which provides variable rotational speeds or translational movements.

9. The pressure exchanger system of claim 8, wherein the drive motor is an electric, hydraulic or hydropneumatic motor.

10. The pressure exchanger system of claim 8, wherein the drive motor is connected with a regulating device which controls the speed or operating dynamics of the drive motor.

11. The pressure exchanger system of claim 1, wherein the tubular chambers are provided with a plurality of sensors which detect the position or movement of separating pistons.

12. The pressure exchanger system of claim 1, wherein regulable valves are provided downstream from a booster pump and a reversing valve.

13. The pressure exchanger system of claim 1, wherein the booster pump or the reversing valve is connected to a regulable drive.

14. The pressure exchanger system of claim 11, wherein the sensors, the regulable valves and the regulable drives are connected to a control and regulating unit.

15. The pressure exchanger system of claim 14, wherein the control and regulating unit uses signals from the sensors to monitor the movement sequences of the fluid flows in the tubular chambers or the separating piston, and if there are deviations from predetermined sequences, the control and regulating unit relays actuator signals to the regulable valves or drives to adjust the regulable valves or drives to regulate the operation of the pressure exchanger system.

16. The pressure exchanger system of claim 15, wherein the control and regulating unit controls and regulates synchronization of the pressure exchanger.

17. The pressure exchanger system of claim 1, further comprising a physical separating body in each tubular chamber.

18. The pressure exchanger system of claim 1, wherein the reversing valve is provided with at least one rotatably driven reversing element.

19. The pressure exchanger system of claim 1, wherein the reversing valve is provided with at least one linearly driven reversing element.

20. The pressure exchanger system of claim 1, wherein the reversing element executes a movement that is a combination of a rotational movement and a translational movement.

21. The pressure exchanger system of claim 1, wherein the driven reversing element in the reversing valve is controlled by a control unit which provides the reversing element with a variable or discontinuous movement sequence.

22. The pressure exchanger system of claim 21, further comprising means for controlling the variable or discontinuous movement sequence of the reversing element.

23. A method of operating a pressure exchanger system comprising driving a reversing element in a reversing valve to alternate the direction of fluid flow in a plurality of tubular chambers, and varying the rate of movement of a driven reversing element to adjust the operation of the pressure exchanger system such that immediately before closure of a tubular chamber the rate of movement of the reversing element is reduced relative to a normal rate of movement thereof.

24. The method of claim 23, wherein the rate of movement of the driven reversing element is reduced while shutting off a filled tubular chamber.

25. The method of claim 23, wherein the direction of movement of the driven reversing element is reversed immediately before closure of a tubular chamber.

26. The method of claim 24, wherein the reduction in the rate of movement of the reversing element occurs within a time period in the range from a few milliseconds to a few seconds.

27. The method of claim 23, comprising wherein the driven reversing element is held in a stationary position after shutting off a tubular chamber filled with low pressure.

28. The method of claim 27, wherein the driven reversing element is held in stationary position for a residence time of from a few milliseconds to a few seconds.

29. The method of claim 27, further comprising the step of accelerating the fluid flow after holding the driven reversing element in stationary position.

30. The method of claim 23, wherein the rate of movement of the driven reversing element is varied by varying the rotational speed or translational movement of a drive motor for the driven reversing element.

31. The method of claim 30, wherein said step of varying the rotational speed or translational movement is controlled by a regulating device.

32. The method of claim 31, further comprising the step of detecting the position or the movement of a separating piston in a tubular chamber with sensors, and supplying sensed position or movement information to the regulating device.

33. The method of claim 23, comprising the step of controlling the operation of at least one of a booster pump or a reversing valve with a regulable drive.

34. The method of claim 23, comprising the step of controlling the operation of at least one of a regulable valve or a regulable drive with a control and regulating unit, said control and regulating unit being at least partially responsive to signals from sensors in one or more tubular chambers.

35. The method of claim 34, comprising the steps of:
detecting deviations from predetermined movement sequences and
varying the operation of the pressure exchanger by actuating regulable valves or regulable drives if such deviations are detected.

36. The method of claim 23, further comprising the steps of:
controlling or regulating the synchronization of the pressure exchanger with a control and regulating unit.

37. The method of claim 23, wherein a physical separating body is disposed in each tubular chamber.

38. The method of claim 23, wherein the driven reversing element is rotated in the reversing valve.

39. The method of claim 23, further comprising the step of actuating one or more linearly driven reversing elements in a reversing valve.

40. The method of claim 23, wherein the driven reversing element executes a combination of a rotational movement and a translational movement.

41. The method of claim 23, further comprising the step of controlling the step of varying the rate of movement of a driven reversing element with a control unit.

42. The method of claim 23, wherein the driven reversing element executes a discontinuous movement sequence.

* * * * *